Figure 1:
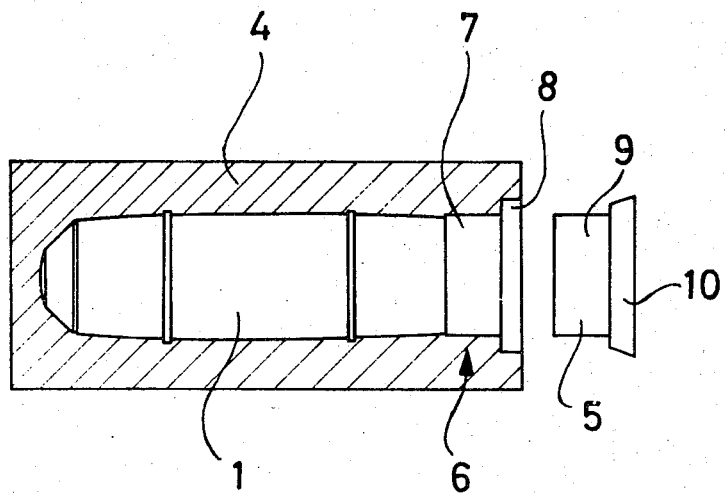

United States Patent [19]

Scheyer

[11] 3,842,514
[45] Oct. 22, 1974

[54] LIQUID LEVEL

[76] Inventor: Guido Scheyer, Hanflandstrasse 15, A6840 Gotzis/Vlbg., Austria

[22] Filed: Sept. 29, 1971

[21] Appl. No.: 184,835

Related U.S. Application Data

[63] Continuation-in-part of Ser. No. 853,254, Aug. 27, 1969, abandoned.

[30] Foreign Application Priority Data

Sept. 28, 1968   Germany............................ 1798351

[52] U.S. Cl.................................... 33/379, 215/47
[51] Int. Cl............................................. G01c 9/26
[58] Field of Search ............................ 33/379–383, 33/390; 156/73; 215/80; 220/DIG. 31

[56] References Cited
UNITED STATES PATENTS

| | | | |
|---|---|---|---|
| 2,627,121 | 2/1953 | Moyer et al. .......................... | 33/379 |
| 2,646,628 | 7/1953 | Shaler .................................... | 33/379 |
| 2,752,693 | 7/1956 | Wullschleger ......................... | 33/379 |
| 3,061,920 | 11/1962 | Johnson ............................ | 33/390 X |
| 3,311,990 | 4/1967 | Wright .................................. | 33/381 |
| 3,438,824 | 4/1969 | Balamuth .............................. | 156/73 |

FOREIGN PATENTS OR APPLICATIONS 556,842   5/1958   Canada ............................... 33/379

Primary Examiner—Louis R. Prince
Assistant Examiner—Charles E. Phillips
Attorney, Agent, or Firm—Michael S. Striker

[57] ABSTRACT

A level comprising a tubular hollow body made at least in part of a transparent plastic material and having an open end filled with a liquid except for a level bubble, and a closure member made of different, softer, more elastic material fluid tightly closing the open end of the tubular body and being ultrasonically bonded thereto.

2 Claims, 2 Drawing Figures

LIQUID LEVEL

This application is a continuation-in-part of application Ser. No. 853,254, filed Aug. 27, 1969, now abandoned.

This invention relates to a level consisting of a level body made at least in part of a transparent synthetic plastic material, said level body having an open end and a closure member for the open end fluid tightly sealing and enclosing the level liquid and level bubble.

In accordance with a known process, the sealing of the opening of the liquid level is achieved by arranging in the open end an aluminum sleeve after which a layer of a rubber like material is placed adjacent the sleeve and a lead plate or pin is then inserted under a driving force. This type of seal involving multiple types of materials and separate insertion steps is very clostly and uneconomical. It is also associated with the danger that in inserting the lead plate or pin under force, the level body being formed of a synthetic resin will undergo crack formation which adversely effects the liquid level.

It is also known to seal the opening by the gluing in of a stopper made of a synthetic material. The adhesive used for this purpose gives rise to the disadvantage that it acts to dissolve the adhering surfaces, i.e., on volatization of the solvent in the adhesive, the sides of the plastic body in contact are altered which alteration results in a shrinkage of the plastic material. This shrinkage sets up tensions which in the course of time, i.e., on aging of the material, results in crack formation so that the fluid tightness of the device is disturbed.

In accordance with another process, the open end of the level body is sealed with a closure member formed of the same material as the level body and namely in a described instance of Plexiglas. The artisan was lead to believe that it was only under such circumstances and namely with the use of identical materials for the level body and the closure that an effective sealing could be achieved. This, however, is not the case and in fact the use of the cement as required for the sealing acts to bring about changes in both the body and closure creating in time the undesirable crack formation.

It is an object of the invention to avoid the disadvantage of the levels as heretofore available and of the known processes for making the same.

It is another object of the invention to provide a liquid level which can be fluid tightly sealed in a simple and economical manner and which remains so sealed over an unlimited life-span.

These and other objects and advantages of the invention will become apparent from a consideration of the following disclosure.

In accordance with the invention an improved liquid level is provided in which the level body is formed at least in part of a transparent plastic material and the closure member therefore is formed of a different softer and more elastic synthetic plastic material than that used for the level body, the closure member being inserted into the hollow body and welded into position therein through the use of supersonic waves or high frequency radial vibrations.

If the material forming the level body for example has a Mohs hardness value of 2.1 – 3, then the Mohs hardness value of the closure amounts to 1 – 2. The elasticity modulus of the synthetic resin for the closure amounts to between 20,000 and 30,000 $kp/cm^2$ and the ball hardness amounts to between 660 and 1,200 $kp/cm^2$.

Most advantageously in accordance with the invention the level body is formed of acrylic glass or of a polyacrylic resin, i.e., a polymerizate or mixed polymerizate of acrylic acid and methacrylic acid as well as of any of the esters, amides and nitriles thereof and the closure member is preferably formed of acrylonitrile- butadiene-styrene consisting predominently of styrene. Through the use of ultrasonic welding techniques for the joining there is in contrast to the known joining techniques realized only an insignificant amount of shrinking tensions in the level body which tensions ar taken up by the softer material forming the closure member so that no cracks or fissures result and a fluid type sealing is ensured. The ultrasonic welding can be carried out using the conventional apparatus and requires only very short periods of time.

The welding of synthetic material with the help of ultrasonic waves, i.e., high frequency radial vibrations is already known and has been used for instance in container manufacture but has heretofore been limited solely to the welding of thin-walled parts. In the welding of the base portion of the container in accordance with this technique, it is necessary to provide an edge on the base which edge is applied onto a mating edge provided on the container portion and with the two edges held in overlapping relationship the high frequency radial forces for effecting the welding are applied. The welding of a large size closure member or stopper with the intent to maintain any shrinkage tension in the plastic material of the body member at the lowest possible value using this technique would never have been considered possible by the artisan.

In accordance with a further characteristic of the invention, the insertion of the closure member is improved over the known art and the fluid tight sealing further ensured in that the open end of the hollow body member is formed of two cylindrical portions, an inner cylindrical portion and an outer cylindrical portion, the latter having a diameter greater than that of the inner cylindrical portion, the closure being formed of a cylindrical portion and a conical portion, the cylindrical portion being press fitted into the inner cylindrical portion of the body member, the conical portion having a mimimum diameter greater than that of the cylindrical portion. On insertion of the closure into the body member there is obtained a fluid tight sealing in that when the closure member is press fitted into the open end of the level body, the level liquid and the level bubble are placed under pressure so that no leakage or unsealing can occur.

The liquid level of the invention in the abovedescribed form of construction comprises:

a. a hollow level body at least in part of transparent material and having a closed end and an open end, said open end having an inner cylindrical portion and an outer cylindrical portion of a diameter greater than that of said cylindrical portion so as to form a shoulder between said two portions;

b. a liquid filling said hollow body except for an air bubble; and c. a one-piece closure means welded to said level body and fluid-tightly closing said open end, said closure means comprising a cylindrical portion press fitted into said inner cylindrical portion of said body and a frustoconical portion of a minimum diameter greater than that of said cylindrical portion and abutting with an end face thereof against said shoulder and press fitted into said outer cylindrical portion of said body.

The method of manufacturing the level comprises the following steps:

a. the step of forming a hollow level body at least in part of transparent material having a closed and an open end;

b. filling said hollow body with a liquid except for a small volume, which in the finished product forms the bubble of the level;

c. press fitting closure means into said open end while simultaneously pressurizing the liquid in said body; and d. welding said closure means to said level body.

Figure 2:
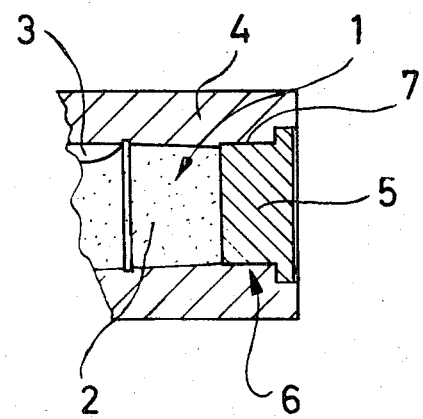

FIG. 1 shows a longitudinal sectional view through a level body and illustrates the closure arrangement according to the present invention; and FIG. 2 shows a partial sectional view of the closure arrangement of FIG. 1 and illustrating the level in closed condition.

Referring now to the drawing in which like reference numerals index like parts the level illustrated in FIGS. 1 and 2 is seen to comprise an interior 1 which is filled with a level liquid 2 and a level bubble 3. The interior 1 is enclosed by a wall which essentially forms a hollow level body 4 which is elongated and tubular in configuration and has an open end 6 operative to permit filling of the interior 1 with the liquid 2. The hollow level body 4 is sealed by a closure member 5. The hollow level body 4 is made of a synthetic transparent resin and specifically of acrylic glass by a die casting process.

The interior 1 as shown in formed as a dead end bore and the open end 6 which communicates with the interior 1 essentially is formed with a first and second cylindrical portion 7 and 8, respectively, in which the closure member 5 is to be pre-fitted (FIG. 1). The outer cylindrical 8 has a larger diameter than the inner cylinder 7.

The closure member 5 is made of a softer and more elastic plastic material than the body 4 and as a rule is not as transparent and in this case is formed of an acrylonitrile- butadiene- styrene resin. The closure member 5 has a cylindrical portion 9 and conical portion 10. The cylindrical portion 9 is arranged to be pre-fitted into the cylindrical mating portion 7 of the open end 6 while the conical portion 10 is to cooperate with the cylindrical portion 8 of the open end 6 and has a maximum outer diameter which is larger than the inner diameter of portion 8 so as to form a press fit therewith (FIG. 2).

The interior 1 is almost completely filled with the liquid 2 except for a volume which eventually in the finished product forms the air bubble 3.

The closure member 5 is pressed with its portion 9 into the cylinder 6 and into the interior 1 so that the fluid in this interior is compressed whereby any leaking or insufficient closing of the closure member would be noticeable immediately. On further pressing, the conical portion 10 is fitted into the cylindrical portion 8.

Following compressing the fluid and press fitting the closure member 5 in the open end 6, the assembly as shown in FIG. 2 is subjected to welding by means of ultrasonic waves. These waves are transferred into the synthetic materials and pass directly therethrough until they impinge on those surfaces which are sought to be welded together. At these surfaces extreme frictional heat is subsequently created which serves to fuse the respective surface together.

It is obvious that the liquid 2 contained in the interior 1 in no way interferes with the welding process as a result of the press fit between the surfaces 7 and 9 of the open end 6 and closure member 5 respectively and further that the contents are also not disturbed by the treatment.

It will be appreciated that with the above arrangement an efficient manner for trouble proof and overall fluid type sealing of the closure member 5 and the level body 1 is provided which offers economical advantages and which from the point of manufacture can be easily realized.

The invention is possessed of considerable advantages as compared to the known devices and in particular advantages derived from the fact that the level body is fluid tightly sealed throughout its life-span. These advantages are directly dependent from the elastic nature of the cover whereby any tensions arising from the welding process are eliminated so that the formation of cracks in the non-elastic plastic forming the body member are avoided. The advantages are also attributable to the use of two different materials for the two components, i.e., the closure and the body and also from the use of the ultrasonic welding method for joining these two different materials.

There can be used other materials than those which have been mentioned for forming the body member and the closure, it being necessary only that there be selected two different materials each of which are possessed of the desired properties. Further the invention may be applied to the manufacture of other levels besides those described specifically in the application as for instance tubular levels, round levels, and the like.

I claim:

1. A method of making a level, comprising the steps of forming a passage in a body composed at least in part of a transparent plastic material, said passage having an open end and said transparent material of said body having a Mohs hardness of between 2.1 and 3, and a first elasticity in the region of said open end; partially filling said passage with a liquid; fitting a closure means into said open end while simultaneously pressuring the interior of sais passage, said closure means consisting of a plastic material other than the plastic material of said body and having a Mohs hardness of between 1 and 2, and a second elasticity of between 20,000 and 30,000 kp/cm$^2$ which is greater than said first elasticity; and ultrasonically welding said closure means to said body while said closure means is fitted into said open end of said passage in said body.

2. A method according to claim 1, wherein the step of forming said passage includes forming abutment means in said open end, and wherein said pressurizing is limited by abutment of said closure means against said abutment means.

* * * * *